United States Patent
Kwon et al.

(10) Patent No.: US 10,129,908 B2
(45) Date of Patent: Nov. 13, 2018

(54) LISTEN BEFORE TALK PROTOCOL SELECTION

(71) Applicant: Intel IP Corporation, Santa Clara, CA (US)

(72) Inventors: Hwan-Joon Kwon, Santa Clara, CA (US); Jeongho Jeon, San Jose, CA (US); Jong-Kae Fwu, Sunnyvale, CA (US); Gang Xiong, Beaverton, OR (US); Shafi Bashar, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/124,953

(22) PCT Filed: Apr. 27, 2015

(86) PCT No.: PCT/US2015/027811
§ 371 (c)(1),
(2) Date: Sep. 9, 2016

(87) PCT Pub. No.: WO2015/168028
PCT Pub. Date: Nov. 5, 2015

(65) Prior Publication Data
US 2017/0034851 A1    Feb. 2, 2017

Related U.S. Application Data

(60) Provisional application No. 61/985,389, filed on Apr. 28, 2014.

(51) Int. Cl.
*H04W 74/08*    (2009.01)
*H04W 16/14*    (2009.01)

(52) U.S. Cl.
CPC ....... *H04W 74/0808* (2013.01); *H04W 16/14* (2013.01)

(58) Field of Classification Search
CPC .............. H04W 16/14; H04W 72/082; H04W 72/0453; H04W 52/243; H04W 52/367;
(Continued)

(56) References Cited

U.S. PATENT DOCUMENTS 8,222,997 B2 *  7/2012  Shin .................. H04W 74/0816
                                                              235/426
2006/0148482 A1   7/2006  Mangold
(Continued)

FOREIGN PATENT DOCUMENTS

WO    2013/086659 A1    6/2013
WO    2013/167557 A1    11/2013

OTHER PUBLICATIONS

International Search Report and Written Opinion dated Aug. 28, 2015 from International Application No. PCT/US2015/027811, 9 pages.
(Continued)

*Primary Examiner* — Sai Aung
(74) *Attorney, Agent, or Firm* — Schwabe, Williamson & Wyatt, P.C.

(57) ABSTRACT

Embodiments of the present disclosure describe apparatuses and methods for determining a listen before talk (LBT) protocol to be used in a long term evolution unlicensed spectrum environment, wherein the LBT protocol is based at least in part on a transmitter-based LBT protocol or a receiver-aided LBT protocol. Other embodiments may be described and/or claimed.

20 Claims, 6 Drawing Sheets

(58) Field of Classification Search
CPC . H04W 72/1231; H04W 28/16; H04W 24/00; H04W 28/04; H04W 28/18; H04W 4/001; H04W 4/005
See application file for complete search history.

(56) References Cited

U.S. PATENT DOCUMENTS

| | | | |
|---|---|---|---|
| 2008/0264431 A1 | 10/2008 | Masoud et al. | |
| 2008/0285489 A1* | 11/2008 | Meier | H01Q 1/007 370/280 |
| 2009/0073928 A1* | 3/2009 | Power | H04L 1/0028 370/329 |
| 2010/0208681 A1 | 8/2010 | Elmaleh | |
| 2013/0156019 A1 | 6/2013 | Chen | |
| 2013/0208587 A1* | 8/2013 | Bala | H04W 16/14 370/230 |
| 2013/0343288 A1* | 12/2013 | Ratasuk | H04W 72/1215 370/329 |
| 2015/0043456 A1* | 2/2015 | Rikkinen | H04B 1/7143 370/329 |

OTHER PUBLICATIONS

Extended European Search Report dated Nov. 9, 2017 from European Patent Application No. 15785307.8, 7 pages.
Office Action dated Dec. 12, 2017 from Japanese Patent Application No. 2016-555743, 6 pages.
Cisco, "On LTE in Unlicensed Spectrum," 3GPP TSG-RAN Meeting #62, RP-131749, Agenda Item: 13.2, Dec. 3-6, 2013, Busan, Korea, 3 pages.
Office Action dated Feb. 14, 2018 from Korean Patent Application No. 2016-7026655, 14 pages.
European Patent Office—Article 94(3) dated Sep. 12, 2018 from European Patent Application No. 15785307.8, 3 pages.

* cited by examiner

LISTEN BEFORE TALK PROTOCOL SELECTION

CROSS REFERENCE TO RELATED APPLICATIONS

The present application is a national phase entry under 35 U.S.C. § 371 of International Application No. PCT/US2015/027811, filed Apr. 27, 2015, entitled "LISTEN BEFORE TALK PROTOCOL SELECTION", which claims priority to U.S. Provisional Patent Application No. 61/985,389, filed Apr. 28, 2014, entitled "ADAPTIVE LBT BASED ON SENSING ENVIRONMENT LEARNING," the entire disclosures of which are hereby incorporated by reference in their entireties for all purposes, except for those sections, if any, that are inconsistent with this specification.

FIELD

Embodiments of the present disclosure generally relate to the field of wireless communication, and more particularly, to apparatuses and methods for enabling communication using unlicensed spectrum.

BACKGROUND

The background description provided herein is for generally presenting the context of the disclosure. Unless otherwise indicated herein, the materials described in this section are not prior art to the claims in this application and are not admitted to be prior art or suggestions of the prior art, by inclusion in this section.

The conventional long term evolution (LTE) system utilizes spectrum that is exclusively assigned to a corresponding LTE service provider (or operator), referred to as LTE in Licensed Spectrum, or simply LTE. Due to an upsurge in demand for wireless broadband data, various approaches are being considered for increasing data throughput of the LTE system. One approach under consideration is to use the LTE system to transmit data through unlicensed spectrum as well as licensed spectrum. The LTE system operating in unlicensed spectrum is often referred to as LTE in Unlicensed Spectrum or LTE-U. Unlicensed spectrum is typically shared with other radio access technologies (RATs) such as IEEE 802.11x (WiFi) or the same RAT deployed by different operators. Therefore, one of the design issues of LTE-U is how to efficiently share the spectrum, also referred to as wireless communications medium, with other RATs and/or operators.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
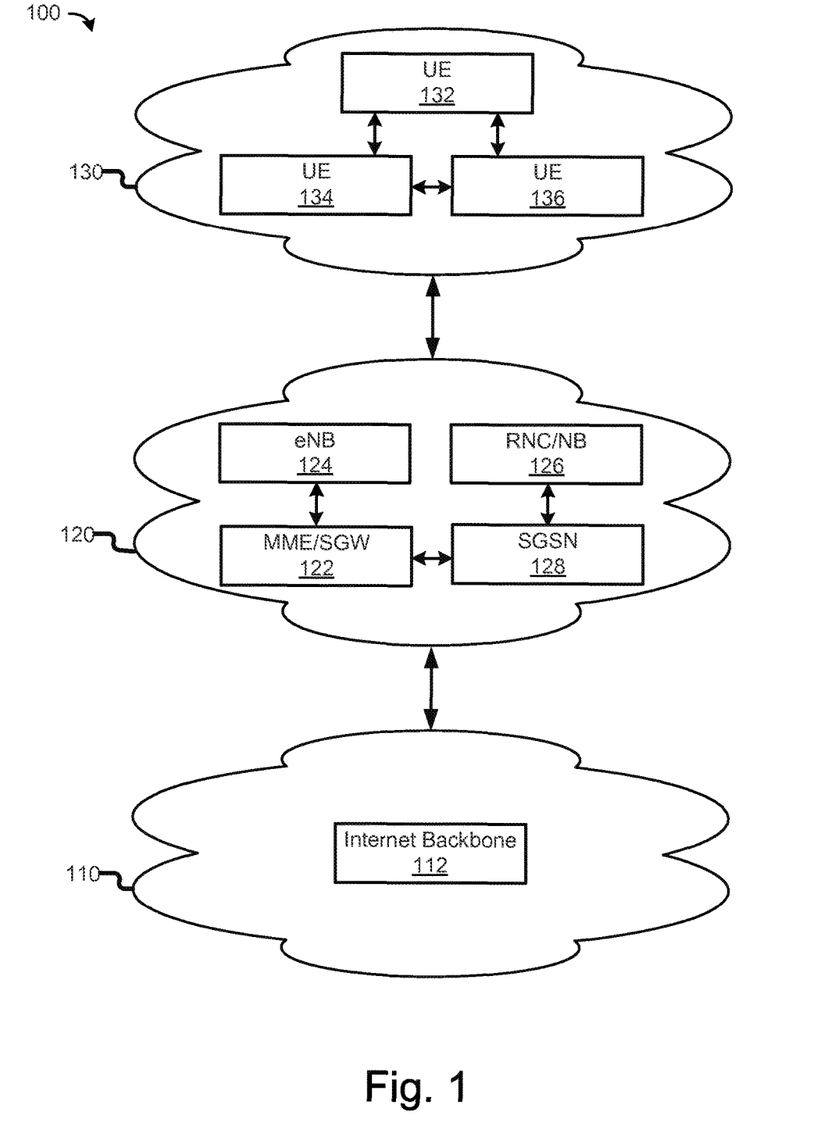
FIG. 1 schematically illustrates a wireless communication system, in accordance with various embodiments.

FIG. 1 schematically illustrates a wireless communication system 100 that incorporates the LBT protocol determination teaching of the present disclosure, in accordance with various embodiments. The wireless communication system 100 may include a backbone network 110, a cellular mobile network 120, and a device-to-device (D2D) network 130. The D2D network 130 may include UEs 132, 134, and 136 that may also communicate using the cellular mobile network 120.

The backbone network 110 may be a part of computer network infrastructure that interconnects various sub-networks and provides a path for the exchange of information between these sub-networks. In various embodiments, the backbone network 110 may include Internet backbone 112, which may include the principal data routes between large, strategically interconnected computer networks and core routers on the Internet.

The cellular mobile network 120 may be in data communication with the backbone network 110. In various embodiments, the cellular mobile network 120 may include one or more radio access networks, such as a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. In some embodiments, a radio access network may include GSM Enhanced Data rates for GSM Evolution (EDGE) Radio Access Network (GERAN), Universal Terrestrial Radio Access Network (UTRAN), or Evolved UTRAN (E-UTRAN). The cellular mobile network 120 may operate in accordance with other network technologies in other embodiments.

Mobile communication technology may rely on various standards and protocols to transmit data between a base station and a wireless communication device. Wireless communication system standards and protocols may include, for example, the 3GPP LTE; the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In a 3GPP radio access network (RAN), according to LTE, the base station may be referred to as an evolved Node B (also commonly denoted as eNodeB, or eNB). It may communicate with a wireless communication device, known as user equipment (UE). Although the present disclosure is presented with terminology and examples generally directed toward 3GPP systems and standards, the teaching disclosed herein may be applied to any type of wireless network or communication standard.

In various embodiments, the cellular mobile network 120 may include eNB 124, radio network controller (RNC) and legacy node B (NB) 126, mobility management entities (MME) and serving gateways (SGW) 122, and serving GPRS support nodes (SGSN) 128. eNB 124 may include more functionality than legacy NB 126, which may be used in a 3G network such as a UMTS network. For example, RNC functionality may be located in eNB 124 rather than being in a separate RNC entity. In LTE, eNB 124 may connect to another eNB by means of an X2 interface that allows the eNBs to forward or share information. In some embodiments, the cellular mobile network 120 may be an Internet Protocol (IP) based network, wherein interfaces between network entities (e.g., eNB 124 and MME/SGW 122) may be based on IP. In some embodiments, MME/SGW 122 may communicate with eNB 124 over an S1 interface. The S1 interface may be similar to the S1 interface as defined in 3GPP Technical Specification (TS) 36.410 V11.1.0 (2013-09) and may support a many-to-many relation between MME/SGW 122 and eNB 124. For example, different operators may simultaneously operate the same eNB in a network sharing setting. In some embodiments, communication between the eNB 124 and UEs may be facilitated via the MME/SGW 122. The MME/SGW 122 may be configured to manage signaling exchanges, e.g., authentication of a UE, such as the UE 132, or perform other actions associated with establishment of a communication link to establish a connected mode of the UE 132 with the cellular mobile network 120. In some embodiments, the MME/SGW 122 may be responsible for tracking and paging user equipment, e.g., when the UE 132 is in an idle mode.

For ease of illustration, various descriptions herein are provided to conform to 3GPP in the communication system 100; however, the subject matter of the present disclosure is not limited in this regard and the embodiments disclosed herein may be advantageously applied to other wired or wireless communication protocols or networks. For example, in an embodiment in which the cellular mobile network 120 includes a UTRAN, the eNB 124 may represent a radio network controller (RNC) configured to communicate with the UEs 132, 134, or 136 (discussed in additional detail below) via a NB. In an embodiment where the cellular mobile network 120 includes a GERAN, the eNB 124 may represent a base station controller (BSC) configured to communicate with the UEs 132, 134, or 136 via a base transmission station (BTS).

In various embodiments, the UE 132 may access the cellular mobile network 120 via a radio link with one of the base stations, e.g., eNB 124. A downlink (DL) transmission may be a communication from the eNB 124 to the UE 132. An uplink (UL) transmission may be a communication from the UE 132 to the eNB 124. Only limited numbers of UEs and eNBs are illustrated in FIG. 1 for ease of illustration. However, the communication system 100 may include any number of UEs, eNBs, or other servers while practicing suitable embodiments of the present disclosure. As an example, in some embodiments, the cellular mobile network 120 may also include other servers, such as a machine type communication (MTC) server (not shown) to facilitate MTC.

In some embodiments, the UE 134 may be configured to communicate with another machine. Data may be transmitted from the UE 134 to another machine or received by the UE 134 from another machine with the need for little or no human interaction. For example, the UE 134 may be a sensor that is electrically coupled to a wireless transceiver (e.g., the transceiver circuitry 224, discussed below with reference to FIG. 2), and may be configured to communicate, with little or no intervention, with another machine (e.g., another sensor). In some embodiments, the wireless transceiver of the UE 134 may also be configured to communicate with at least one of a wireless metropolitan area network (WMAN), a wireless local area network (WLAN), or a wireless personal area network (WPAN).

In some embodiments, the UE 136 may be a mobile communication device, a subscriber station, or another device that is configured to communicate with the cellular mobile network 120, e.g., via the eNB 124, in conformance with an appropriate protocol (e.g., a multiple-input/multiple-output (MIMO) communication scheme). As discussed in further detail below, the UEs, 132, 134, and/or 136 may be configured to enable D2D functionality. In embodiments, D2D functionality may also be referred to as sidelink direct communication (SL).

In various embodiments, UE 132, UE 134, and UE 136 may form a D2D network 130. In the D2D network 130, two UEs in proximity may directly communicate with each other without the assistance of eNB 124 or any other base stations and cellular mobile networks. Direct communication between devices is commonly known as D2D direct communication or peer-to-peer (P2P) communication. In various embodiments, D2D communication may be established directly by UEs or may be at least partially facilitated by an eNB.

D2D operation in the D2D network 130 may be non-transparent to the cellular mobile network 120 and may occur on a cellular spectrum (for example, inband) or unlicensed spectrum (for example, outband). D2D operation in the D2D network 130 may be realized in different communication technologies. In some embodiments, short-range technologies, such as Bluetooth or Wi-Fi may be used. In some embodiments, D2D operation may reuse licensed LTE spectrum or unlicensed LTE spectrum.

Figure 2:
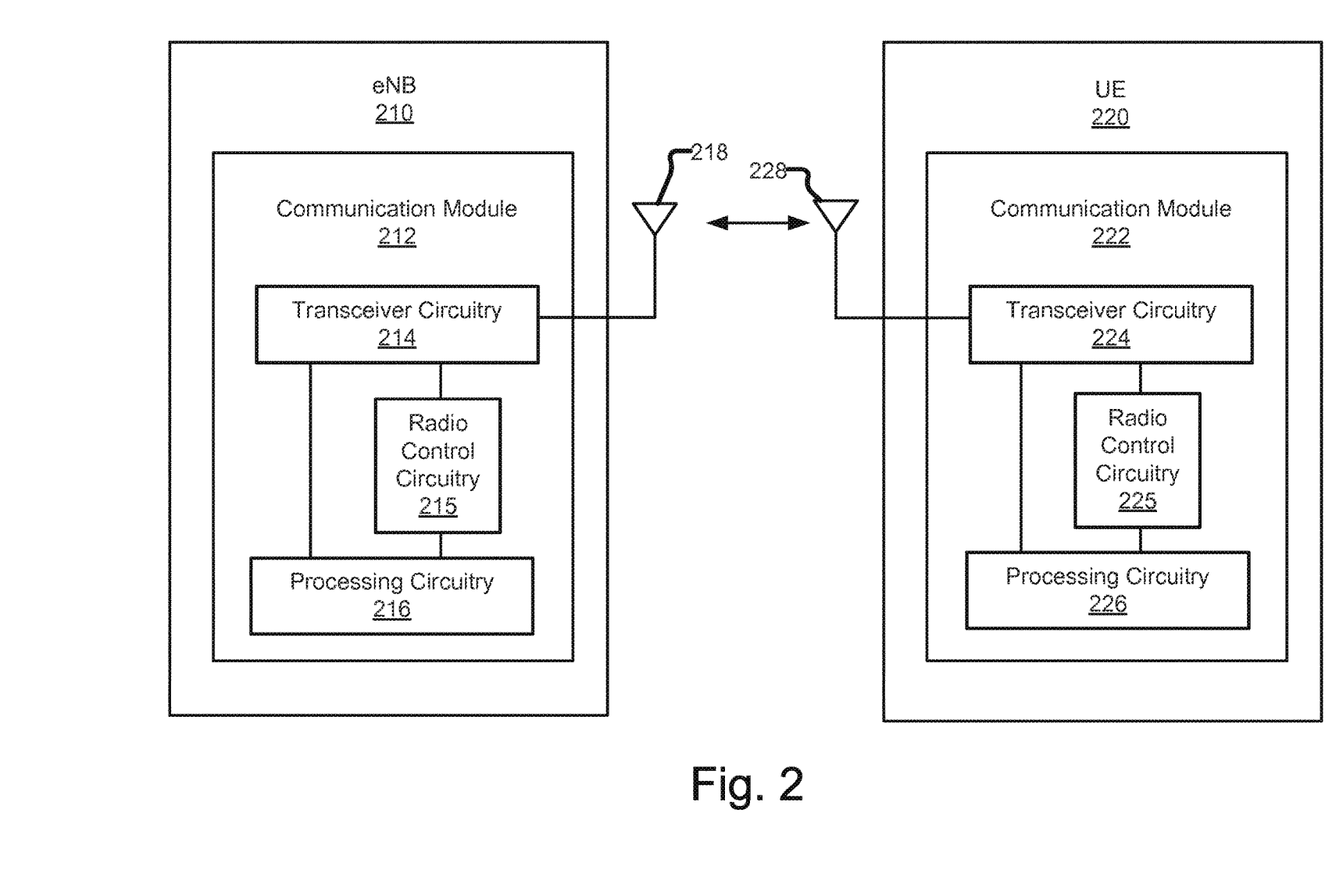
FIG. 2 is a schematic block diagram illustrating components of an evolved node B (eNB) and a UE, in accordance with various embodiments.

FIG. 2 is a schematic block diagram illustrating components of an eNB 210 and a UE 220 in a wireless communication environment that incorporate the LBT protocol determination teaching of the present disclosure in accordance with various embodiments. The eNB 210 may be similar to, and substantially interchangeable with eNB 124 of FIG. 1. In embodiments, the eNB 210 may include one or more antennas 218 and a communication module 212. In various embodiments, transceiver circuitry 214, radio control circuitry 215, and processing circuitry 216 within the communication module 212 may be coupled with each other as shown. Likewise, the UE 220 may be similar to, and substantially interchangeable with UE 132, 134, or 136 of FIG. 1. In embodiments, the UE 220 may include one or more antennas 228 and a communication module 222. In various embodiments, transceiver circuitry 224, radio control circuitry 225, and processing circuitry 226 within the communication module 222 may be coupled with each other as shown.

In various embodiments, the processing circuitry 216 of the eNB 210 or the processing circuitry 226 of the UE 220 may determine a current LBT protocol to be used in a LTE-U environment, with the current LBT protocol being based at least in part on a Tx-based LBT protocol or a Rx-aided LBT protocol. The radio control circuitry 215 of the eNB 210 or the radio control circuitry 225 of the UE 220 may generate a signal based at least in part on the determined current LBT protocol and may control the transceiver circuitry 214 or the transceiver circuitry 224, respectively, to send the signal to a wireless communication device. In embodiments, the radio control circuitry 215 may function in both transmit (e.g., encoding) and receive (e.g., decoding directions).

The transceiver circuitry 214 may be coupled with the antennas 218 to facilitate over-the-air communication of signals to and from the eNB 210. Operations of the transceiver circuitry 214 may include, but are not limited to, filtering, amplifying, storing, switching, etc. In various embodiments, the transceiver circuitry 214 may be configured to provide various signal processing operations on the signal to the antennas 218 with appropriate characteristics. In some embodiments, the transceiver circuitry 214 may be configured to communicate with UEs that have D2D operation capabilities. The transceiver circuitry 214 may be configured to receive signals from the antennas 218 for transmission to other components of the eNB 210 and/or for internal processing by the processing circuitry 216.

The processing circuitry 216 may generate configuration and control information to UEs of a serving cell, e.g., UE 220, and generate signals to transmit the configuration and control information to the UEs via the transceiver circuitry 214. The configuration and control information may include, for example, downlink channel information, downlink control information (DCI), radio resource control (RRC) configuration information, etc. In some embodiments, such configuration and control information may include a system information block (SIB) message to activate at least one of D2D discovery, D2D communication, or D2D relay functionality of the UE 220.

Similar to the communication module 212, the communication module 222 may be coupled with the antennas 228 to facilitate over-the-air communication of signals between UE 220 and eNB 210 or between UE 220 and another UE. For example, the transceiver circuitry 224 may be configured to provide various signal processing operations on the signal to the antennas 228 with suitable characteristics. In various embodiments, operations of the transceiver circuitry 224 may include, but are not limited to, filtering, amplifying, storing, switching, etc. The transceiver circuitry 224 may be configured to receive signals from the antennas 218, and then transmit the signals to other components of the UE 220 and/or for internal processing by the processing circuitry 226.

In some embodiments, the UE 220 may include one or more antennas 228 to concurrently utilize radio resources of multiple respective component carriers. The UE 220 may be configured to communicate using Orthogonal Frequency Division Multiple Access (OFDMA) (in, e.g., downlink communications) and/or Single-Carrier Frequency Division Multiple Access (SC-FDMA) (in, e.g., uplink communications). In some embodiments, the UE 220 may use the transceiver circuitry 224 to communicate with another UE via LTE ProSe or LTE Direct.

In some embodiments, communication module 222 may be configured to provide communication services for one or more subscriber identity modules (SIMs) (not shown) with which it may be coupled. In some embodiments, the SIMs may be removably coupled with the communication module 222. In other embodiments, the SIMs may be hardware and/or firmware that are permanently coupled with the UE 220. In various embodiments, the SIMs may include full-size SIMs, mini-SIMs, micro-SIMs, nano-SIMs, embedded SIMs, and/or virtual SIMs.

The SIMs may be integrated circuits that securely store subscriber identity information such as international mobile subscriber identity (IMSI) and related keys used to identify and authenticate one or more subscribers using the UE 220. Each SIM may be associated with different subscriber identity information and may or may not be associated with different carriers. In various embodiments, IMSI and related information may be used to facilitate D2D discovery and D2D operation.

Figure 5:
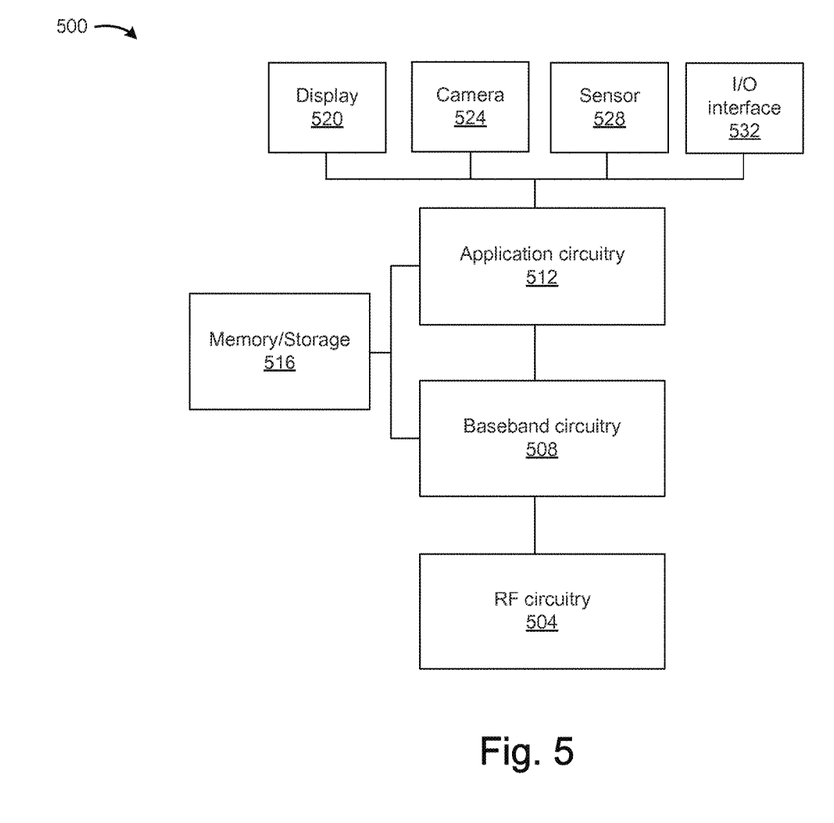
FIG. 5 is a block diagram of an example computing device that may be used to practice various embodiments described herein.

Some or all of the transceiver circuitry 224 and/or processing circuitry 226 may be included in, for example, radio frequency (RF) circuitry or baseband circuitry as described below with respect to FIG. 5. In various embodiments the UE 220 may be, may include, or may be included in a single sensor device, a cellular telephone, a personal computer (PC), a notebook, an ultrabook, a netbook, a smartphone, an ultra mobile PC (UMPC), a handheld mobile device, an universal integrated circuit card (UICC), a personal digital assistant (PDA), a Customer Premise Equipment (CPE), a tablet computing device, or other consumer electronics such as MP3 players, digital cameras, and the like. In some embodiments, the UE may include a mobile station, as defined by IEEE 802.16e (2005 or 802.16m (2009) or some other revision of the IEEE 802.16 standard, or user equipment, as defined by 3GPP LTE Release 8 (2008), Release 9 (2009), Release 10 (2011), Release 12 (under development), or some other revision or release of the 3GPP LTE standards.

A possible approach for implementing LTE-U so that the medium is efficiently shared is to adopt a LBT protocol (or carrier sense multiple access with collision avoidance (CSMA/CA)). With an LBT scheme, the LTE transmitter (e.g., eNB 210) senses the medium before transmitting data. If the medium is sensed to be idle, the transmitter transmits data. Otherwise, the transmitter waits for a predefined period and repeats the channel sensing procedure. This type of LBT scheme may be referred to as transmitter-based LBT (Tx-based LBT).

A problem related to using only Tx-based LBT may be that the transmitter sometimes may not be able to detect ongoing transmissions by other transmitters, but the target receiver (e.g., UE 220) may be able to detect them. This problem may be referred to as a hidden node problem. The hidden node problem may be mitigated by using a request-to-send/clear-to-send (RTS/CTS) protocol. A brief summary of the RTS/CTS protocol is (i) the transmitter sends an RTS signal when it detects the medium as idle, (ii) once the target receiver detects the RTS signal, it sends a CTS signal if the medium is sensed to be idle, (iii) if the transmitter detects the CTS signal, it transmits data. An LBT scheme where the receiver helps the transmitter sense the medium, such as the RTS/CTS protocol, may be referred to as receiver-aided LBT (Rx-aided LBT). In embodiments, variations of Tx-based LBT and/or Rx-aided LBT may be used.

Although an Rx-aided LBT such as RTS/CTS may mitigate the hidden node problem in some instances, it sometimes degrades performance due to its additional overhead (e.g., when the transmitter can accurately sense the medium and the additional handshaking would not be needed). In various embodiments, an adaptive LBT scheme, such as that described with respect to FIG. 3 or FIG. 4, may be used to allow a transmitting device to determine whether a Tx-based or an Rx-aided LBT scheme should be used. In embodiments, the adaptive LBT scheme may improve system performance such as user throughput, system throughput, and/or delay performance by adjusting the appropriate LBT mechanism according to different deployment scenarios.

Figure 3:
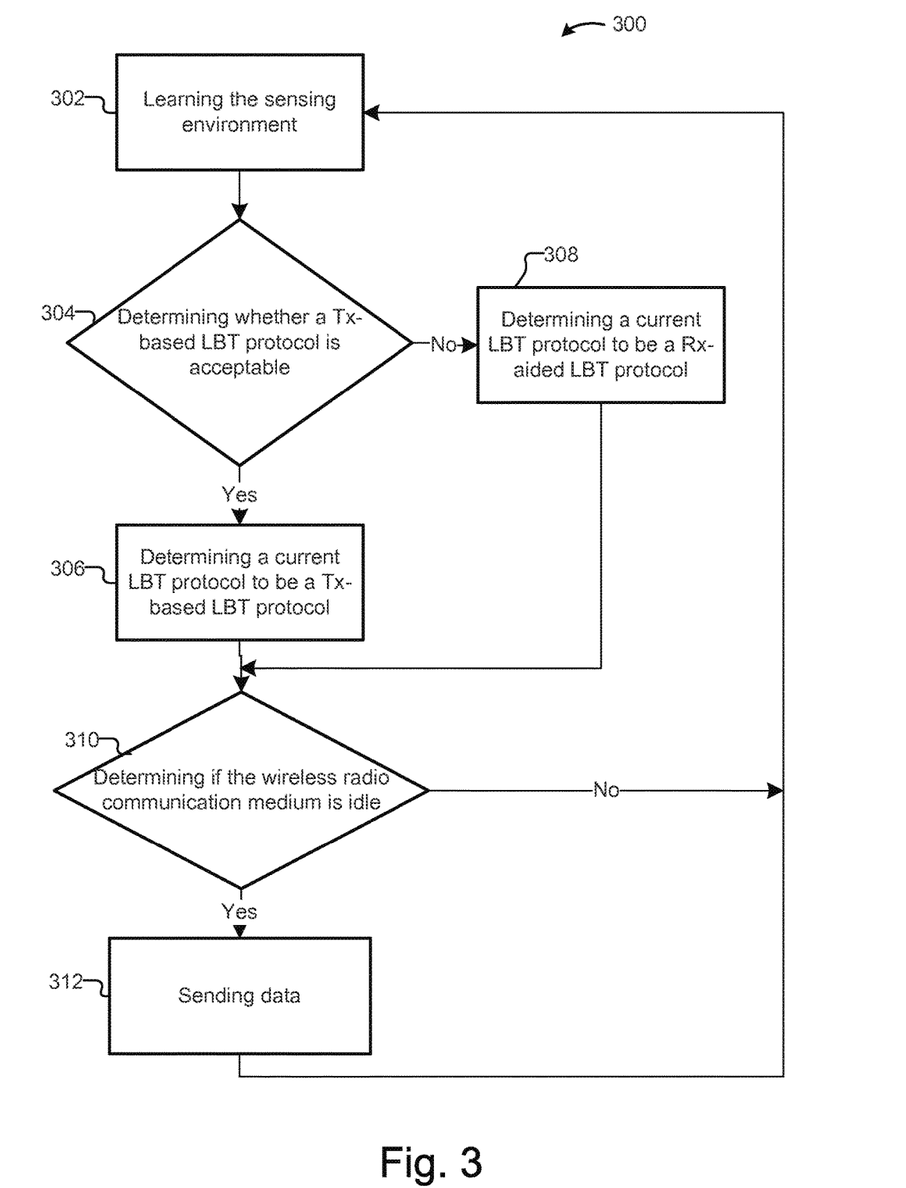
FIG. 3 is a flowchart of a method of selecting a listen before talk (LBT) protocol, in accordance with some embodiments.

FIG. 3 is a flowchart of a method 300 of selecting a LBT protocol in an LTE unlicensed spectrum environment and communicating based at least in part on the selected LBT protocol. At a block 302, the method 300 may include learning the sensing environment. In embodiments, the sensing environment may be learned by sharing sensing results between a transmitting device, such as the eNB 210, and a receiving device, such as the UE 220, (e.g., feedback or exchange of sensing results between transceivers). In embodiments, both a transmitter (e.g., LTE-U eNB) and a receiver (e.g., LTE-U UE) may sense a wireless radio communication medium at a set of time intervals (e.g., every 10 milliseconds for one second). In embodiments, the transmitter and the receiver may simultaneously sense the communication medium at the set of time intervals. The time intervals may be cell-specific (e.g., configured by system information), UE-specific (e.g., through RRC signaling), or specific to a group of UEs. The set of intervals may include a measurement interval and period of feedback or exchange (e.g., every X-th orthogonal frequency-division multiplexing (OFDM) symbol of every Y-th radio frame). In embodiments, the sensing intervals may be independent of any actual LTE-U transmissions. In embodiments, the transmitter and the receiver may share the sensing results, or may report sensing results or statistics to the other.

In embodiments, a UE, such as the UE 220, (or both a UE and an eNB) may report or exchange sensing results for a predetermined past number (e.g., Z) of time instances, such as Z=100 time instances. In embodiments, the sensing results may be either busy or idle (busy/idle). For busy/idle sensing results, the report may be a bitmap of Z-bits in length. In other embodiments, the sensing results may be idle/LTE-U/WiFi/Both, where 'LTE-U' indicates that the medium is busy due to other LTE-U transmission(s). Similarly, 'WiFi' indicates that the medium is busy due to other WiFi transmission(s). 'Both' indicates that the medium is busy due to the transmissions of LTE-U and WiFi. In embodiments, the information of interfering sources in addition to idle/busy state information may help a scheduler at an eNB determine a finer scheduling policy. For example, the scheduler may schedule a data transmission (e.g., physical downlink shared channel (PDSCH)) even when the medium is busy, if the interfering source is not WiFi, but is LTE-U. For idle/LTE-U/WiFi/Both sensing results, the report may be a reporting message such as a bitmap with a size of 2×Z bits.

In embodiments, a sensing report may be triggered by an eNB in an aperiodic manner. In other embodiments, the sensing report may be periodic. The sensing report may be transmitted in physical uplink control channel (PUCCH) in various embodiments. Configuration of periodicity and subframe offset for the sensing report may be configured in a manner provided by high-layer signaling in various embodiments.

In embodiments, the transmitter (e.g., eNB 210) may compare its own stored sensing results with the UE sensing report and learn about the current sensing environment of the corresponding UE. At a decision block 304, it may be determined whether Tx-based LBT is acceptable. In embodiments, if the sensing results between the eNB and a UE are highly correlated, the eNB may determine that the sensing environments between the eNB and the UE are quite similar and determine that Tx-based LBT can be used because it will provide sufficient accuracy. If the eNB and UE are not highly correlated, the eNB may determine that the sensing environment of a particular receiver (the particular UE associated with the sensing report) is different from that of the eNB and, therefore, Rx-aided LBT would be desirable to use. Accordingly, in embodiments, the transmitter may select Tx-based LBT at a block 306 or Rx-aided LBT at a block 308 based at least in part on a correlation level between the sensing results of the transmitter and the receiver to determine a current LBT protocol to be used. In embodiments, the correlation level may be compared to a predefined correlation level that indicates Tx-based LBT is acceptable. The correlation level may be indicated by a correlation coefficient such as Pearson's correlation coefficient in various embodiments. If the correlation coefficient is greater than or equal to a predefined threshold value (e.g., 0.9), it may be determined that Tx-based LBT is acceptable. Other threshold values, other indicators of correlation level, or other comparison methods may be used in various embodiments. In various embodiments, the processing circuitry 216 of the eNB 210 or the processing circuitry 226 of the UE 220 may perform the processes at one or more of the block 302, the decision block 304, the block 306, or the block 308.

Generally, UEs may see an unlicensed channel environment differently depending on their geographical location, making it difficult to make a decision that applies to all UEs with respect to whether Rx-aided LBT should be used. In embodiments, a transmitter such as an eNB may categorize UEs into two groups. The two groups may be a correlated group (or regular group) and an uncorrelated group (or hidden node group). The correlated group of UEs may be those that see the unlicensed channel environment similarly to the eNB. In other words, the sensing results between these UEs and the eNB may be highly correlated. The uncorrelated group may be the group of UEs that sees the unlicensed channel environment differently than the eNB, as may be determined by the sensing results between these UEs and the eNB not being as highly correlated. In embodiments, the categorization may be based at least in part on a correlation level that may be indicated by a correlation coefficient such as Pearson's correlation coefficient, where sensing results by the eNB correspond to a first variable, sensing results by the UE correspond to a second variable, and the correlation coefficient is the covariance of the two variables divided by the product of their standard deviations. If the correlation coefficient is greater than or equal to a predetermined threshold (e.g., 0.9), the corresponding UE may be categorized in the correlated group in various embodiments. Other threshold values may be used, other indicators of correlation level, or other comparison methods may be used in various embodiments.

For UEs that have already been categorized, the eNB may start transmitting data immediately to the UEs in the correlated group based on the Tx-based LBT only. For UEs in the uncorrelated group, the eNB may request or configure additional Rx-aided LBT. The UE categorization may be performed based at least in part on sensing measurement reports from UEs over a specified period of time. The UE categorization may be updated periodically or on an as needed basis in various embodiments. The update interval may be decided based at least in part on a rate of change of a correlation between sensing results of individual UEs and the eNB. In some embodiments, UE categorization may be performed centrally at the eNB as described above based at least in part on the sensing outcome feedback from the associated UEs. The UE categorization may also be performed distributively and/or independently at each UE based at least in part on information broadcast from the eNB about its sensing results in various embodiments. Upon receiving the sensing results from the eNB, each UE may compare the eNB sensing results with its own sensing results and declare itself as a member of a correlated or an uncorrelated group. In embodiments where the determination is made in a distributive fashion, raw sensing data feedback from UEs to an eNB may not be transmitted, but a decision outcome on whether the UE has declared itself to be in a correlated or an uncorrelated group may be sent back to the eNB.

In embodiments, a transmitter such as an eNB may group UEs based at least in part on their location. The eNB may collect and accumulate information from multiple UEs about a desirable LBT scheme (Tx-based or Rx-aided) based at least in part on the position of the UE. In embodiments, the eNB may generate a sensing environment map. In embodiments, the sensing environment map may include regular areas where all UEs in the area may be categorized in a correlated group, hidden node areas where all UEs in the area may be categorized in an uncorrelated group, and indeterminate areas where there may be a mixture of correlated and uncorrelated UEs or where no UEs have been categorized. When a new UE joins the network associated with the eNB, the eNB may categorize the newly joined UE based at least in part on its proximity to known UEs. In embodiments, the eNB may categorize the newly joined UE in a regular group if it is in close proximity to UEs categorized into that group or within the regular area of the sensing environment map, and the eNB may categorize the newly joined UE into an uncorrelated group if it is in close proximity to UEs with sensing data that is not highly correlated or within a hidden node area of the sensing environment map. In embodiments, if the newly joined UE is in relatively equal proximity to both correlated and uncorrelated UEs or if the newly joined UE is in an indeterminate area of the sensing environment map, the eNB may request sensing data from the newly joined UE to perform a new categorization. In embodiments where the newly joined UE is in close proximity to UEs from only one of the categories or is located in a regular or hidden node area of the sensing environment map, the eNB may perform the categorization without using sensing data from the newly joined UE.

After learning the sensing environment at the block 302, the method 300 may proceed to the decision block 304 that may include determining whether a Tx-based LBT protocol is acceptable. If, at the decision block 304, it is determined Tx-based LBT is acceptable, the method may proceed to the block 306 that may include determining a current LBT protocol to be a Tx-based LBT protocol. If, at the decision block 304, it is determined Tx-based LBT is not acceptable, the method 300 may proceed to the block 308, that may include determining a current LBT protocol to be a Rx-aided LBT protocol. After a current LBT protocol is determined, the method 300 may proceed to a decision block 310 that may include determining if the wireless radio communication medium is idle using the determined current LBT protocol. If the wireless radio communication medium is idle, the method 300 may proceed to a block 312 that may include sending data. In various embodiments, if the wireless radio communication medium is not idle, the method 300 may wait for a predefined period of time, such as 100 milliseconds, then determine again whether the wireless radio communication medium is idle (loop at decision block 310 not shown). In some embodiments, if the wireless radio communication medium is not idle, the method may return to the block 302. In embodiments, after data is sent at the block 312, the method 300 may return to the block 302. In some embodiments, a transmitting device may retain a determined current LBT protocol for a predefined period of time such that the next time data is to be sent, the current LBT protocol will be used without learning the sensing environment again. In embodiments, the current LBT protocol may be updated periodically by returning to the block 302, such as if a predefined period of time has passed since the current LBT protocol was determined. In embodiments, repetition periods for one or more of the block 302, the decision block 304, the block 306, the block 308, the decision block 310, or the block 312 may vary in a cell-specific of a UE-specific manner. In some embodiments, the repetition periods may be the same. In various embodiments, the radio control circuitry 215 of the eNB 210 or the radio control circuitry 225 of the UE 220 may generate a signal based at least in part on the current LBT protocol and control transceiver circuitry to send the signal at the block 312.

Figure 4:
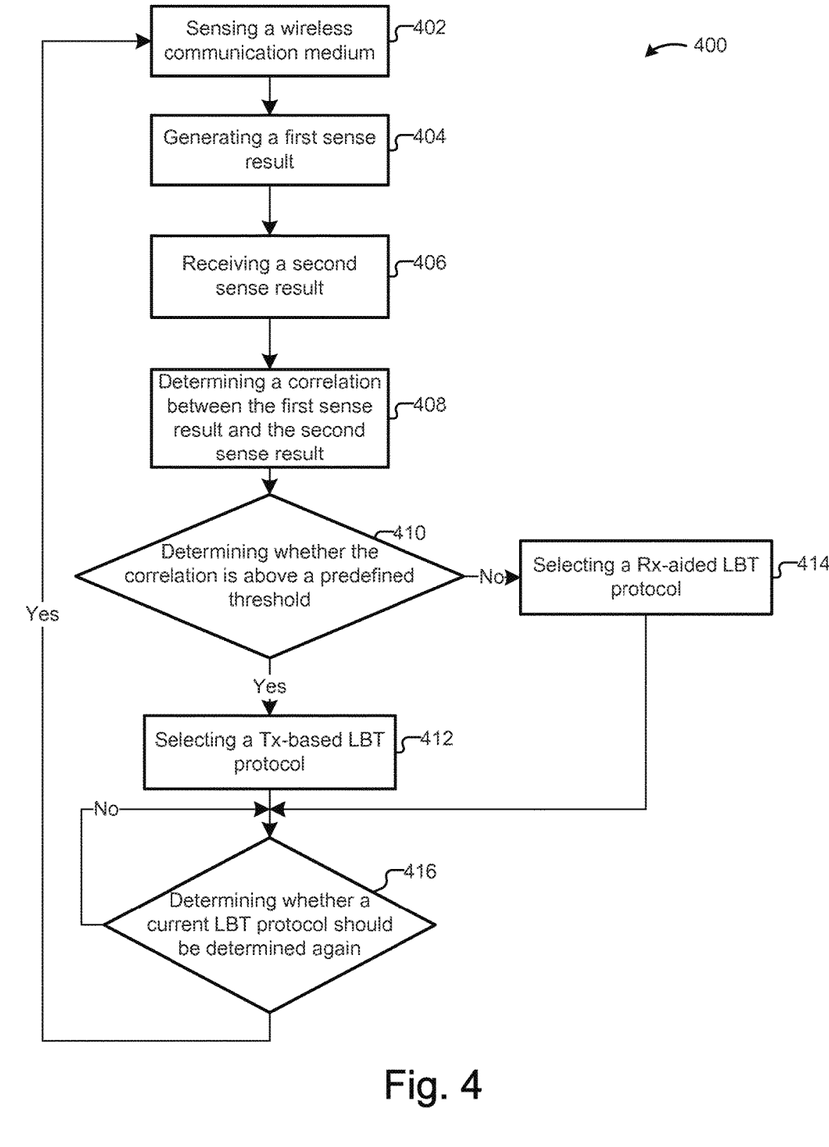
FIG. 4 is a flowchart of a method of selecting a LBT protocol based at least in part on a correlation of sense results, in accordance with some embodiments.

FIG. 4 is a flowchart of a method 400 of selecting a LBT protocol based at least in part on a correlation of sense results, in accordance with some embodiments. At a block 402, the method 400 may include sensing a wireless communication medium. In embodiments, the communication medium may be sensed by a transmitting device such as the eNB 124 of FIG. 1 or the eNB 210 of FIG. 2. In embodiments, the communication medium may be sensed at a predetermined number of time intervals. In embodiments, a power level of the communication medium may be sensed by a transmitting device such as the eNB 210 at each time in the predetermined number of time intervals. At a block 404, the method 400 may include generating a first sense result. In embodiments, the first sense result may be a bitmap indicating whether the communication medium was sensed to be idle or busy at each time in the predetermined number of time intervals. In embodiments, the communication medium may be indicated as idle if the sensed power level is below a predefined threshold level. In other embodiments, the first sense result may be a bitmap indicating whether the communication medium was sensed to be idle, busy due to LTE-U transmissions, busy due to WiFi transmissions, or busy due to both LTE-U and WiFi transmissions. At a block 406, the method 400 may include receiving a second sense result. In embodiments, the second sense result may be received at a transmitting device such as the eNB 210 from a receiving device, such as the UE 220. The second sense result may be a bitmap indicating whether the communication medium was sensed as idle/busy or idle/LTE-U/WiFi/

Both as sensed by a receiving device, such as the UE 220 at each time in a predetermined number of time intervals. In embodiments, the time intervals used in generating the first sense result and the second sense result may be the same. In embodiments, block 402, block 404, and block 406 correspond to learning the sensing environment at the block 302 of FIG. 3.

At a block 408, the method 400 may include determining a correlation between the first sense result and the second sense result. In embodiments, the correlation may be determined by calculating a correlation coefficient such as Pearson's correlation coefficient. The correlation may be determined in other ways in various embodiments. At a decision block 410, the method 400 may include determining whether the correlation is above a predefined threshold. In embodiments, block 408 and decision block 410 correspond to determining whether Tx-based LBT is acceptable at the decision block 304 of FIG. 3.

If, at the decision block 410, it is determined that the correlation is above the predefined threshold, the method 400 may proceed to a block 412 that may include selecting a Tx-based LBT protocol. If, at the decision block 410, it is determined that the correlation is not above the predefined threshold, the method 400 may proceed to a block 414 that may include selecting a Rx-aided LBT protocol. A current LBT protocol to be used may be determined based at least in part on the protocol selected at the block 412 or the block 414. Data may be sent based at least in part on the determined protocol such as discussed with respect to the block 312 of FIG. 3. At a decision block 416, the method 400 may include determining whether a current LBT protocol should be determined again. If, at the decision block 416, it is determined that a current LBT protocol should not be determined again, the method 400 may wait in a loop at the decision block 416. If, at the decision block 416, it is determined that a current LBT protocol should be determined again, the method 400 may return to the block 402. In embodiments, a current LBT protocol may be determined after waiting for a predetermined period of time at the decision block 416. In various embodiments, the processing circuitry 216 of the eNB 210 or the processing circuitry 226 of the UE 220 may perform one or more of the processes described with respect to the blocks and decision blocks of the method 400.

Although the transmitter may be an eNB and a receiver may be a UE as discussed with respect to the method 300 of FIG. 3 and the method 400 of FIG. 4, in various embodiments any pair of transceivers may function as a transmitter and receiver. In embodiments, the transmitter or the receiver may be an LTE UE (e.g., UE 132, 134, 136, or 220), an eNB (e.g., eNB 124 or 210), a WiFi station, a WiFi access point, etc. In embodiments, the method 300 of FIG. 3 or the method 400 of FIG. 4 may be performed between UEs using device-to-device (D2D) communication in an unlicensed band where two (or more) UEs (e.g., UE 132 and UE 134) directly communicate with each other where one UE becomes the transmitter and the other(s) become the receiver. LBT may be performed before data transmission and reception between UEs to allow more efficient sharing of the medium with other RATs. In embodiments, an eNB may assist the D2D UEs in determining which LBT scheme (Tx-based LBT or Tx-aided LBT) to apply. In embodiments, the eNB may know the locations of the two (or more) UEs and information related to which LBT scheme is proper for the particular locations, and may inform the D2D UEs of an appropriate LBT scheme based at least in part on this information. In embodiments, a default mode of Tx-based LBT may be established and, if needed, as determined based at least in part on the method 300 of FIG. 3 or the method 400 of FIG. 4, Rx-aided LBT may be enabled or Rx-aided LBT may replace the Tx-based LBT in an enhanced mode.

The UE 220 or the eNB 210, as described in connection with FIG. 2, may be implemented into a system using any suitable hardware, firmware, and/or software configured as desired. FIG. 5 illustrates, for one embodiment, an example system 500 including radio frequency (RF) circuitry 504, baseband circuitry 508, application circuitry 512, memory/storage 516, display 520, camera 524, sensor 528, and input/output (I/O) interface 532, coupled with each other at least as shown.

The application circuitry 512 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 516 and configured to execute instructions stored in the memory/storage 516 to enable various applications and/or operating systems running on the system 500.

The baseband circuitry 508 may include circuitry such as, but not limited to, one or more single-core or multi-core processors. The processor(s) may include a baseband processor. The baseband circuitry 508 may handle various radio control functions that enable communication with one or more radio networks via the RF circuitry 504. The radio control functions may include, but are not limited to, signal modulation, encoding, decoding, radio frequency shifting, etc. In some embodiments, the baseband circuitry 508 may provide for communication compatible with one or more radio technologies. For example, in some embodiments, the baseband circuitry 508 may support communication with an E-UTRAN and/or other WMAN, a WLAN, or a WPAN. Embodiments in which the baseband circuitry 508 is configured to support radio communications of more than one wireless protocol may be referred to as multi-mode baseband circuitry.

In various embodiments, baseband circuitry 508 may include circuitry to operate with signals that are not strictly considered as being in a baseband frequency. For example, in some embodiments, baseband circuitry 508 may include circuitry to operate with signals having an intermediate frequency, which is between a baseband frequency and a radio frequency.

In some embodiments, the processing circuitry 216 or 226 of FIG. 2 may be embodied in the application circuitry 512 and/or the baseband circuitry 508. In embodiments, the radio control circuitry 215 or 225 of FIG. 2 may be embodied in the baseband circuitry 508.

RF circuitry 504 may enable communication with wireless networks using modulated electromagnetic radiation through a non-solid medium. In various embodiments, the RF circuitry 504 may include switches, filters, amplifiers, etc., to facilitate the communication with the wireless network.

In various embodiments, RF circuitry 504 may include circuitry to operate with signals that are not strictly considered as being in a radio frequency. For example, in some embodiments, RF circuitry 504 may include circuitry to operate with signals having an intermediate frequency, which is between a baseband frequency and a radio frequency.

In some embodiments, the transceiver circuitry 214 or 224 of FIG. 2 may be embodied in the RF circuitry 504. In embodiments, the radio control circuitry 215 or 225 of FIG. 2 may be embodied in the RF circuitry 504.

In some embodiments, some or all of the constituent components of the baseband circuitry 508, the application circuitry 512, and/or the memory/storage 516 may be implemented together on a system on a chip (SOC).

Memory/storage 516 may be used to load and store data and/or instructions, for example, for system 500. Memory/storage 516 for one embodiment may include any combination of suitable volatile memory (e.g., dynamic random access memory (DRAM)) and/or non-volatile memory (e.g., Flash memory).

In various embodiments, the I/O interface 532 may include one or more user interfaces to enable user interaction with the system 500 and/or peripheral component interfaces to enable peripheral component interaction with the system 500. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 528 may include one or more sensing devices to determine environmental conditions and/or location information related to the system 500. In some embodiments, the sensors may include, but are not limited to, a gyro sensor, an accelerometer, a proximity sensor, an ambient light sensor, and a positioning unit. The positioning unit may also be part of, or interact with, the baseband circuitry 508 and/or RF circuitry 504 to communicate with components of a positioning network, e.g., a global positioning system (GPS) satellite.

In various embodiments, the display 520 may include a display, e.g., a liquid crystal display, a touch screen display, etc. In some embodiments, the camera 524 may include many molded plastic aspheric lens elements made with varying dispersion and refractive indexes. In some embodiments, the camera 524 may include two or more lenses to capture three-dimensional images for stereo photography.

In various embodiments, the system 500 may be a mobile computing device such as, but not limited to, a laptop computing device, a tablet computing device, a netbook, an ultrabook, a smartphone, etc. In various embodiments, system 500 may have more or fewer components, and/or different architectures.

Figure 6:
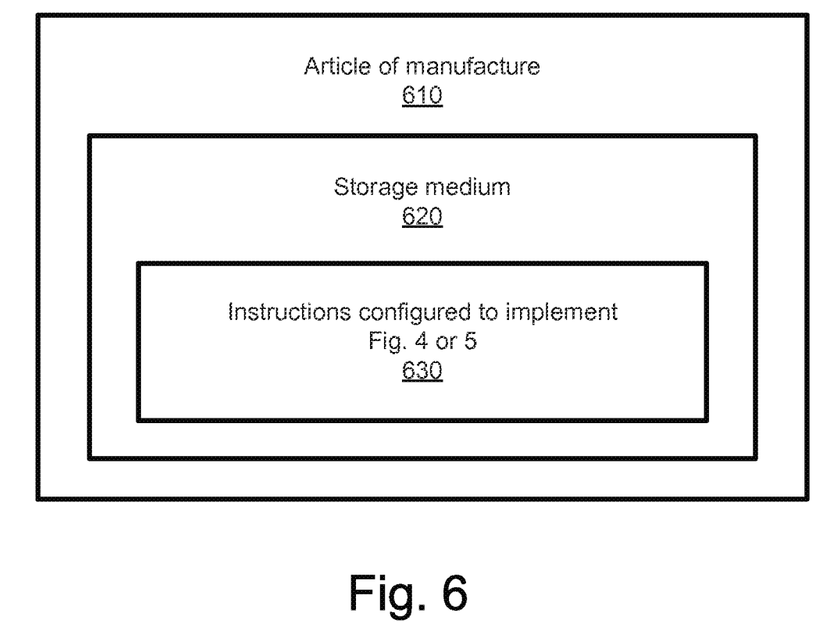
FIG. 6 illustrates an article of manufacture having programming instructions incorporating aspects of the present disclosure, in accordance with various embodiments.

FIG. 6 illustrates an article of manufacture 610 having programming instructions, incorporating aspects of the present disclosure, in accordance with various embodiments. In various embodiments, an article of manufacture may be employed to implement various embodiments of the present disclosure. As shown, the article of manufacture 610 may include a computer-readable non-transitory storage medium 620 where instructions 630 may be configured to practice embodiments of or aspects of embodiments of any one of the processes described herein. The storage medium 620 may represent a broad range of persistent storage media known in the art, including but not limited to flash memory, dynamic random access memory, static random access memory, an optical disk, a magnetic disk, etc. In embodiments, computer-readable storage medium 620 may include one or more computer-readable non-transitory storage media. In other embodiments, computer-readable storage medium 620 may be transitory, such as signals, encoded with instructions 630.

In various embodiments, instructions 630 may enable an apparatus, in response to its execution by the apparatus, to perform various operations described herein. As an example, storage medium 620 may include instructions 630 configured to cause an apparatus, e.g., eNB 210 in connection with FIG. 2, to practice some aspects of learning a sensing environment and selecting an LBT protocol, (e.g., as illustrated in method 300 of FIG. 3 or method 400 of FIG. 4), in accordance with embodiments of the present disclosure.

The following paragraphs describe examples of various embodiments.

Example 1 may include an apparatus for wireless communication comprising: processing circuitry to determine a current listen before talk (LBT) protocol to be used in a long term evolution unlicensed spectrum (LTE-U) environment, wherein the current LBT protocol is a transmitter-based LBT protocol or a receiver-aided LBT protocol; and radio control circuitry, coupled with the processing circuitry, the radio control circuitry to generate a signal based at least in part on the current LBT protocol and to control transceiver circuitry to send the signal from a user equipment (UE) to a wireless communication device.

Example 2 may include the subject matter of Example 1, wherein the processing circuitry is to determine the current LBT protocol based at least in part on a first sense result and a second sense result, wherein the first sense result includes an indication of whether an unlicensed radio communication medium is idle as sensed by the apparatus at a first set of time intervals, and wherein the second sense result includes an indication of whether the unlicensed radio communication medium is idle as sensed by the wireless communication device at a second set of time intervals.

Example 3 may include the subject matter of Example 2, wherein the first set of time intervals and the second set of time intervals are the same.

Example 4 may include the subject matter of any one of Examples 2-3, wherein the processing circuitry is to: determine a correlation level between the first sense result and the second sense result; and determine the current LBT protocol based at least in part on the correlation level.

Example 5 may include the subject matter of any one of Examples 2-4, wherein the first sense result includes an indication of whether the unlicensed radio communication medium as sensed by the apparatus is idle or busy due to LTE-U transmissions, WiFi transmissions, or both LTE-U and WiFi transmissions, and wherein the second sense result includes an indication of whether the unlicensed radio communication medium as sensed by the wireless communication device is idle or busy due to LTE-U transmissions, WiFi transmissions, or both LTE-U and WiFi transmissions.

Example 6 may include the subject matter of any one of Examples 2-5, wherein the current LBT protocol is a first current LBT protocol, wherein the processing circuitry is to determine a second current LBT protocol based at least in part on a third sense result and a fourth sense result, wherein the third sense result includes an indication of whether the unlicensed radio communication medium is idle as sensed by the apparatus at a third set of time intervals, wherein the fourth sense result includes an indication of whether the unlicensed radio communication medium is idle as sensed by the wireless communication device at a fourth set of time intervals, and wherein the processing circuitry is to determine the second current LBT protocol after a predetermined period of time has elapsed following determination of the first current LBT protocol.

Example 7 may include the subject matter of any one of Examples 1-5, wherein the wireless communication device is an evolved node B (eNB).

Example 8 may include the subject matter of any one of Examples 1-5, wherein the wireless communication device is another UE, and wherein the radio control circuitry is to control the transceiver circuitry to send the signal using device-to-device (D2D) communication.

Example 9 may include an evolved node B (eNB) comprising: processing circuitry to: determine a current listen before talk (LBT) protocol to be used in a long term evolution unlicensed spectrum (LTE-U) environment, wherein the current LBT protocol is a transmitter-based LBT protocol or a receiver-aided LBT protocol; and generate a signal for transmission to a User Equipment (UE) based at least in part on the current LBT protocol; and radio control circuitry, coupled with the processing circuitry, to send the signal to the UE.

Example 10 may include the subject matter of Example 9, wherein the processing circuitry is to determine the current LBT protocol based at least in part on a first sense result and a second sense result, wherein the first sense result includes an indication of whether an unlicensed radio communication medium is idle as sensed by the eNB at a first set of time intervals, and wherein the second sense result includes an indication of whether the unlicensed radio communication medium is idle as sensed by the UE at a second set of time intervals.

Example 11 may include the subject matter of Example 10, wherein the first set of time intervals and the second set of time intervals are the same.

Example 12 may include the subject matter of any one of Examples 10-11, wherein the processing circuitry is to: determine a correlation level between the first sense result and the second sense result; and determine the current LBT protocol based at least in part on the correlation level.

Example 13 may include the subject matter of any one of Examples 10-12, wherein the current LBT protocol is a first current LBT protocol, wherein the processing circuitry is to determine a second current LBT protocol based at least in part on a third sense result and a fourth sense result, wherein the third sense result includes an indication of whether the unlicensed radio communication medium is idle as sensed by the eNB at a third set of time intervals, wherein the fourth sense result includes an indication of whether the unlicensed radio communication medium is idle as sensed by the UE at a fourth set of time intervals, and wherein the processing circuitry is to determine the second current LBT protocol after a predetermined period of time has elapsed following determination of the first current LBT protocol.

Example 14 may include the subject matter of any one of Examples 10-13, wherein the first sense result includes an indication of whether the unlicensed radio communication medium as sensed by the eNB is idle or busy due to LTE-U transmissions, WiFi transmissions, or both LTE-U and WiFi transmissions, and wherein the second sense result includes an indication of whether the unlicensed radio communication medium as sensed by the UE is idle or busy due to LTE-U transmissions, WiFi transmissions, or both LTE-U and WiFi transmissions.

Example 15 may include the subject matter of any one of Examples 9-14, wherein the processing circuitry is to categorize the UE into one of a regular group or a hidden node group, and wherein the processing circuitry is to determine the current LBT protocol based at least in part on whether the UE is in the regular group or the hidden node group.

Example 16 may include the subject matter of any one of Examples 9-14, wherein the processing circuitry is to determine the current LBT protocol based at least in part on a location of the UE.

Example 17 may include a method for wireless communication, comprising: sensing, by a first wireless communication device, an unlicensed radio communication medium to generate a first sense result including an indication of whether the unlicensed radio communication medium is idle; receiving, by the first wireless communication device, a second sense result that includes an indication of whether the unlicensed radio communication medium is idle as sensed by a second wireless communication device; determining, by the first wireless communication device, a current listen before talk (LBT) protocol to be used in a long term evolution unlicensed spectrum (LTE-U) environment wherein the current LBT protocol is one of a transmitter-based LBT protocol or a receiver-aided LBT protocol based at least in part on the first sense result and the second sense result; and transmitting, by the first wireless communication device, a signal to the second wireless communication device based at least in part on the current LBT protocol.

Example 18 may include the subject matter of Example 17, further comprising determining, by the first wireless communication device, a correlation level between the first sense result and the second sense result, wherein the first wireless communication device determines the current LBT protocol based at least in part on the correlation level.

Example 19 may include the subject matter of Example 18, wherein determining the current LBT protocol includes determining, by the first wireless communication device, that the current LBT protocol is a receiver-aided LBT protocol in response to the correlation level determined to be below a predefined threshold value.

Example 20 may include the subject matter of any one of Examples 18-19, wherein the current LBT protocol is a first current LBT protocol, the method further comprising determining, by the first wireless communication device, a second LBT protocol after a predetermined time period has elapsed following determination of the first current LBT protocol.

Example 21 may include at least one non-transitory computer-readable medium comprising instructions stored thereon that, in response to execution of the instructions by one or more processors of a first wireless communication device cause the first wireless communication device to: sense an unlicensed radio communication medium to generate a first sense result including an indication of whether the unlicensed radio communication medium is idle; receive a second sense result that includes an indication of whether the unlicensed radio communication medium is idle as sensed by a second wireless communication device; determine a current listen before talk (LBT) protocol to be used in a long term evolution unlicensed spectrum (LTE-U) environment wherein the current LBT protocol is one of a transmitter-based LBT protocol or a receiver-aided LBT protocol based at least in part on the first sense result and the second sense result; and transmit a signal to the second wireless communication device based at least in part on the current LBT protocol.

Example 22 may include the subject matter of Example 21, wherein the first wireless communication device is further caused to determine a correlation level between the first sense result and the second sense result, wherein the first wireless communication device is to determine the current LBT protocol based at least in part on the correlation level.

Example 23 may include the subject matter of Example 22, wherein the first wireless communication device is further caused to determine that the current LBT protocol is a receiver-aided LBT protocol in response to the correlation level determined to be below a predefined threshold value.

Example 24 may include the subject matter of any one of Examples 22-23, wherein the current LBT protocol is a first current LBT protocol, and wherein the first wireless communication device is further caused to determine a second LBT protocol after a predetermined time period has elapsed following determination of the first current LBT protocol.

Example 25 may include a wireless communication device, comprising: means for sensing an unlicensed radio communication medium to generate a first sense result including an indication of whether the unlicensed radio communication medium is idle; means for receiving a second sense result that includes an indication of whether the unlicensed radio communication medium is idle as sensed by a second wireless communication device; means for determining a current listen before talk (LBT) protocol to be used in a long term evolution unlicensed spectrum (LTE-U) environment wherein the current LBT protocol is one of a transmitter-based LBT protocol or a receiver-aided LBT protocol based at least in part on the first sense result and the second sense result; and means for transmitting a signal to the second wireless communication device based at least in part on the current LBT protocol.

Example 26 may include the subject matter of Example 25, further comprising means for determining a correlation level between the first sense result and the second sense result, wherein the means for determining the current LBT protocol is to determine the current LBT protocol based at least in part on the correlation level.

Example 27 may include the subject matter of Example 26, wherein the means for determining the current LBT protocol is to determine that the current LBT protocol is a receiver-aided LBT protocol in response to the correlation level determined to be below a predefined threshold value.

Example 28 may include the subject matter of any one of Examples 26-27, wherein the current LBT protocol is a first current LBT protocol, the wireless communication device further comprising means for determining a second LBT protocol after a predetermined time period has elapsed following determination of the first current LBT protocol.

Example 29 may include at least one non-transitory computer-readable medium comprising instructions stored thereon that, in response to execution of the instructions by one or more processors of a user equipment (UE) cause the UE to: sense an unlicensed radio communication medium to generate a first sense result including an indication of whether the unlicensed radio communication medium is idle; receive a second sense result from an evolved node B (eNB) that includes an indication of whether the unlicensed radio communication medium is idle as sensed by the eNB; and determine whether the UE is part of a correlated group based at least in part on the first sense result and the second sense result.

Example 30 may include the subject matter of Example 29, wherein the UE is further caused to determine a correlation level between the first sense result and the second sense result, wherein the UE is to determine whether it is part of the correlated group based at least in part on the correlation level.

Example 31 may include the subject matter of Example 30, wherein the UE is to determine that it is part of the correlated group in response to the correlation level determined to be greater than or equal to a predefined threshold value.

Example 32 may include the subject matter of any one of Examples 29-31, wherein the UE is further caused to transmit a signal to the eNB indicating whether it is part of the correlated group.

Example 33 may include a wireless communication device comprising means for performing any one of the methods of Examples 29-32.

The description herein of illustrated implementations, including what is described in the Abstract, is not intended to be exhaustive or to limit the present disclosure to the precise forms disclosed. While specific implementations and examples are described herein for illustrative purposes, a variety of alternate and/or equivalent embodiments or implementations calculated to achieve the same purposes may be made in light of the above detailed description, without departing from the scope of the present disclosure, as those skilled in the relevant art will recognize.

What is claimed is:

1. An apparatus for wireless communication comprising:
a processing circuitry to select a current listen before talk (LBT) protocol to be used in a long term evolution unlicensed spectrum (LTE-U) environment, wherein the current LBT protocol is to be selected from a plurality of LBT protocols that includes a transmitter-based LBT protocol and a receiver-aided LBT protocol; and
a radio control circuitry, coupled with the processing circuitry, the radio control circuitry to generate a signal based at least in part on the current LBT protocol and to control transceiver circuitry to send the signal from a user equipment (UE) to a wireless communication device, wherein the processing circuitry is to select the current LBT protocol based at least in part on a first sense result and a second sense result, wherein the first sense result includes an indication of whether an unlicensed radio communication medium is idle as sensed by the apparatus at a first set of time intervals, and wherein the second sense result includes an indication of whether the unlicensed radio communication medium is idle as sensed by the wireless communication device at a second set of time intervals.

2. The apparatus of claim 1, wherein the first set of time intervals and the second set of time intervals are the same.

3. The apparatus of claim 1, wherein the processing circuitry is to:
determine a correlation level between the first sense result and the second sense result; and
select the current LBT protocol based at least in part on the correlation level.

4. The apparatus of claim 1, wherein the first sense result includes an indication of whether the unlicensed radio communication medium as sensed by the apparatus is idle or busy due to LTE-U transmissions, WiFi transmissions, or both LTE-U and WiFi transmissions, and wherein the second sense result includes an indication of whether the unlicensed radio communication medium as sensed by the wireless communication device is idle or busy due to LTE-U transmissions, WiFi transmissions, or both LTE-U and WiFi transmissions.

5. The apparatus of claim 1, wherein the current LBT protocol is a first current LBT protocol, wherein the processing circuitry is to select a second current LBT protocol based at least in part on a third sense result and a fourth sense result, wherein the third sense result includes an indication of whether the unlicensed radio communication medium is idle as sensed by the apparatus at a third set of time intervals, wherein the fourth sense result includes an indication of whether the unlicensed radio communication medium is idle as sensed by the wireless communication device at a fourth set of time intervals, and wherein the processing circuitry is to select the second current LBT protocol after a predetermined period of time has elapsed following determination of the first current LBT protocol.

6. The apparatus of claim 1, wherein the wireless communication device is an evolved node B (eNB).

7. The apparatus of claim 1, wherein the wireless communication device is another UE, and wherein the radio control circuitry is to control the transceiver circuitry to send the signal using device-to-device (D2D) communication.

8. An evolved node B (eNB) comprising:
a processing circuitry to:
determine a current listen before talk (LBT) protocol to be used in a long term evolution unlicensed spectrum (LTE-U) environment, wherein the current LBT protocol is a transmitter-based LBT protocol or a receiver-aided LBT protocol, wherein the processing circuitry is to determine the current LBT protocol based at least in part on a first sense result and a second sense result, wherein the first sense result includes an indication of whether an unlicensed radio communication medium is idle as sensed by the eNB at a first set of time intervals, and wherein the second sense result includes an indication of whether the unlicensed radio communication medium is idle as sensed by a User Equipment (UE) at a second set of time intervals; and
generate a signal for transmission to the UE based at least in part on the current LBT protocol; and
a radio control circuitry, coupled with the processing circuitry, to send the signal to the UE.

9. The eNB of claim 8, wherein the first set of time intervals and the second set of time intervals are the same.

10. The eNB of claim 8, wherein the processing circuitry is to:
determine a correlation level between the first sense result and the second sense result; and
determine the current LBT protocol based at least in part on the correlation level.

11. The eNB of claim 8, wherein the current LBT protocol is a first current LBT protocol, wherein the processing circuitry is to determine a second current LBT protocol based at least in part on a third sense result and a fourth sense result, wherein the third sense result includes an indication of whether the unlicensed radio communication medium is idle as sensed by the eNB at a third set of time intervals, wherein the fourth sense result includes an indication of whether the unlicensed radio communication medium is idle as sensed by the UE at a fourth set of time intervals, and wherein the processing circuitry is to determine the second current LBT protocol after a predetermined period of time has elapsed following determination of the first current LBT protocol.

12. The eNB of claim 8, wherein the first sense result includes an indication of whether the unlicensed radio communication medium as sensed by the eNB is idle or busy due to LTE-U transmissions, WiFi transmissions, or both LTE-U and WiFi transmissions, and wherein the second sense result includes an indication of whether the unlicensed radio communication medium as sensed by the UE is idle or busy due to LTE-U transmissions, WiFi transmissions, or both LTE-U and WiFi transmissions.

13. The eNB of claim 12, wherein the processing circuitry is to categorize the UE into one of a regular group or a hidden node group, and wherein the processing circuitry is to determine the current LBT protocol based at least in part on whether the UE is in the regular group or the hidden node group.

14. The eNB of claim 12, wherein the processing circuitry is to determine the current LBT protocol based at least in part on a location of the UE.

15. At least one non-transitory computer-readable medium comprising instructions stored thereon that, in response to execution of the instructions by one or more processors of a user equipment (UE) cause the UE to:
sense an unlicensed radio communication medium to generate a first sense result including an indication of whether the unlicensed radio communication medium is idle;
receive a second sense result from an evolved node B (eNB) that includes an indication of whether the unlicensed radio communication medium is idle as sensed by the eNB; and
determine whether the UE is part of a correlated group based at least in part on the first sense result and the second sense result, wherein the UE is further caused to determine a correlation level between the first sense result and the second sense result, wherein the UE is to determine whether it is part of the correlated group based at least in part on the correlation level.

16. The at least one non-transitory computer-readable medium of claim 15, wherein the UE is to determine that it is part of the correlated group in response to the correlation level determined to be greater than or equal to a predefined threshold value.

17. The at least one non-transitory computer-readable medium of claim 15, wherein the UE is further caused to transmit a signal to the eNB indicating whether it is part of the correlated group.

18. At least one non-transitory computer-readable medium comprising instructions stored thereon that, in response to execution of the instructions by one or more processors of a first wireless communication device cause the first wireless communication device to:
sense an unlicensed radio communication medium to generate a first sense result including an indication of whether the unlicensed radio communication medium is idle;
receive a second sense result that includes an indication of whether the unlicensed radio communication medium is idle as sensed by a second wireless communication device;
determine a current listen before talk (LBT) protocol to be used in a long term evolution unlicensed spectrum (LTE-U) environment wherein the current LBT protocol is one of a transmitter-based LBT protocol or a receiver-aided LBT protocol based at least in part on the first sense result and the second sense result; and
transmit a signal to the second wireless communication device based at least in part on the current LBT protocol, wherein the first wireless communication device is further caused to determine a correlation level between the first sense result and the second sense result, wherein the first wireless communication device is to determine the current LBT protocol based at least in part on the correlation level.

19. The at least one non-transitory computer-readable medium of claim 18, wherein the first wireless communication device is further caused to determine that the current LBT protocol is a receiver-aided LBT protocol in response to the correlation level determined to be below a predefined threshold value.

20. The at least one non-transitory computer-readable medium of claim 18, wherein the current LBT protocol is a first current LBT protocol, and wherein the first wireless communication device is further caused to determine a second LBT protocol after a predetermined time period has elapsed following determination of the first current LBT protocol.

* * * * *